US006974289B2

(12) United States Patent  (10) Patent No.: US 6,974,289 B2
Levey et al.  (45) Date of Patent: Dec. 13, 2005

(54) PRESSURE FLANK SCREW AND FASTENING SYSTEM THEREWITH

(75) Inventors: Kenneth R. Levey, West Chicago, IL (US); John D. Fischer, Whitmore Lake, MI (US); Lawrence W. Johnson, Taylor, MI (US)

(73) Assignee: Illinois Tool Works Inc, Glenview, IL (US)

( * ) Notice: Subject to any disclaimer, the term of this patent is extended or adjusted under 35 U.S.C. 154(b) by 0 days.

(21) Appl. No.: 10/600,195

(22) Filed: Jun. 20, 2003

(65) Prior Publication Data
US 2004/0028499 A1 Feb. 12, 2004

Related U.S. Application Data

(60) Provisional application No. 60/402,772, filed on Aug. 12, 2002.

(51) Int. Cl.⁷ ............................. F16B 39/30; F16B 37/02
(52) U.S. Cl. ........................ 411/310; 411/308; 411/311; 411/174; 411/175; 411/296
(58) Field of Search ....................... 411/174, 175, 308, 411/310, 311, 296, 299, 329

(56) References Cited

U.S. PATENT DOCUMENTS

| 113,557 | A | * | 4/1871 | Pearson | 411/272 |
| 2,601,651 | A | * | 6/1952 | Wandy | 411/306 |
| 3,339,389 | A | * | 9/1967 | Mosow | 72/88 |
| 3,661,194 | A | * | 5/1972 | Macfarlane et al. | 411/311 |
| 3,937,119 | A | * | 2/1976 | Ernst | 411/422 |
| 3,972,360 | A | * | 8/1976 | Cadwallader | 411/310 |
| 3,982,575 | A | * | 9/1976 | Ollis et al. | 411/310 |
| 4,273,175 | A | | 6/1981 | Capuano | 411/168 |
| 4,411,147 | A | | 10/1983 | Capuano | 72/220 |
| 4,576,534 | A | | 3/1986 | Barth et al. | 411/412 |
| 4,653,968 | A | * | 3/1987 | Rapata et al. | 411/247 |
| 4,655,661 | A | | 4/1987 | Brandt | 411/387 |
| 4,810,149 | A | * | 3/1989 | Lee et al. | 411/411 |
| 5,044,853 | A | | 9/1991 | Dicke | 411/311 |
| 5,569,009 | A | | 10/1996 | Suzuki | 411/413 |
| 6,336,779 | B1 | | 1/2002 | Jakob et al. | 411/175 |
| 6,419,435 | B1 | | 7/2002 | Gaudron | 411/412 |
| 2002/0081171 | A1 | | 6/2002 | Werner et al. | 411/423 |

FOREIGN PATENT DOCUMENTS

| DE | 2 240 528 | 7/1974 |
| DE | 44 37 798 A1 | 4/1995 |
| DE | 199 20 616 A1 | 12/2000 |
| EP | 0 071 844 A2 | 7/1982 |
| EP | 0 133 773 | 7/1984 |
| GB | 2 046 862 A | 12/1980 |
| WO | WO 00/68585 | 11/2000 |

* cited by examiner

*Primary Examiner*—Katherine Mitchell
(74) *Attorney, Agent, or Firm*—Mark W. Croll; Paul F. Donovan

(57) ABSTRACT

A male threaded fastening member is provided with depressions in at least one or several helix wraps of the thread adjacent the head, the depressions extending inwardly from an edge of the thread at least part way toward a shank of the male fastening member. In a fastening system including the male fastening member, a female member includes projections for engaging the depressions.

18 Claims, 4 Drawing Sheets

PRESSURE FLANK SCREW AND FASTENING SYSTEM THEREWITH

CROSS-REFERENCE TO RELATED APPLICATIONS

The present application claims benefit to U.S. Provisional Application Ser. No. 60/402,772 filed on Aug. 12, 2002.

BACKGROUND OF THE INVENTION

The present invention relates generally to threaded fasteners, and, more particularly, the invention relates to male threaded fasteners and threaded fastener systems having a male fastening member and a female fastening member.

BACKGROUND OF THE INVENTION

Threaded fasteners and threaded fastener systems including male and female members are used extensively in a variety of assemblies and constructions. It is known to use a male threaded member in combination with a female threaded member comprising a stamping or other plate-like or cupped member, in which a single helix thread is provided in the female member. A problem with threaded fastener systems having female members with a single helix thread is that the fastener can become loose due to vibration and other external forces exerted against the fastening system. The small amount of surface contact between the male fastener component and the single helix thread of a stamped female member is one cause for this undesirable effect. When the male and female member start to move, the natural ramped surface contact between the surfaces allows the system to loosen. While the significance of this problem can be reduced to some extent by providing additional thread length in the female member through the inclusion of additional helixes in the thread, in some assemblies and constructions there is insufficient room for providing additional length to the female member. Further, the member becomes more complex and difficult to manufacture, thereby increasing the cost of the fastening system, as the simple stamping procedures used for a single helix fastener system may not be satisfactory for a more complex fastener system.

Is it also known to provide fastening systems in which the female member is clipped or in some way connected to an object such as a piece of sheet metal or other thin material. Although in some fastening systems the female members have considerable thickness, thereby providing a thread including several helix wraps, loosening of the fastener system continues to be a problem. If the material to which the female member is connected is relatively thin with minimal strength, such as thin-gauge sheet metal, the material can bend or deflect as additional torque is applied to the male member, to bind the threads of the male and female member more tightly. Thus, since only minimal torque can be applied, the fastener system can be loosened easily through vibration and other external forces.

Another problem sometimes experienced is strip-out due to over-tightening of the fastener. Particularly in assemblies that are lightweight, in which the fasteners also are lightweight, it may be difficult to determine when sufficient torque has been applied for optimum fastener performance. Under tightening can lead to loosening in use, and over tightening can result in strip-out. The acceptable torque window available for proper tightening may be quite small.

Male threaded members anchored in plastic have similar and additional problems. It is desirable to provide a screw that drives in easily, straight and that fastens securely. Modifying thread profiles to improve resistance to pull-out has resulted in blunting the thread crest, which can cause excessive material removal as the screw is driven. Material removal reduces the holding strength of the fastener.

What is needed in the art is a male threaded member and a threaded fastening system that improve retention between the male threaded member and the female threaded member or anchoring material in which the fastener is secured for a variety of applications, including threaded fastening systems having female members comprising a single helix thread, and fastening systems applied to relatively thin material limiting the torque that can be applied in making the threaded connection. What is further needed is a male fastening member that drives easily and straight, with increased holding strength in plastics and other similar materials.

SUMMARY OF THE INVENTION

The present invention provides a male threaded fastening member in which surface undulations or depressions are provided in at least a portion of the thread adjacent the head of the member, at least near the edge of the thread. The present invention also provides a threaded fastener system having a female member including projections to be received in the undulations or depressions of the male threaded member.

In one form thereof, the present invention provides a threaded fastener with a shank having a head end and a lead end, a head at the head end, and a helical thread disposed about the shank. The thread has an outer edge, a drive flank facing the lead end and a pressure flank facing the head end, and a series of depressions in the pressure flank along at least a portion of a length of the thread.

In another form thereof, the present invention provides a threaded fastening system with a male fastening member and a female fastening member adapted for threaded engagement with each other. The male fastening member includes a shank having a head end and a lead end, a head at the head end and a thread disposed about the shank. The thread has an outer edge, a drive flank facing the lead end, a pressure flank facing the head end and a series of depressions in the pressure flank along at least a portion of a length of the thread. The female fastening member is adapted for receiving the male fastening member therein, and includes: a body defining an aperture therethrough, with at least one helical thread defined by the aperture adapted for engaging the thread of the male fastening member. The body has irregularities forming projections for engaging the depressions of the threads on the male fastening member.

In still another form thereof, the present invention provides a threaded fastening system with a male fastening member and a female fastening member adapted for threaded engagement with each other. The male fastening member includes a shank having a head end and a lead end, a head at the head end and a thread disposed about the shank. The thread has an outer edge, a drive flank facing the lead end and a pressure flank facing the head end. A series of depressions in the pressure flank are along at least a portion of a length of the thread adjacent the head. The female fastening member is a sheet metal, single helix nut adapted for receiving the male fastening member therein. The female fastening member includes a body shaped as a dome defining an aperture therethrough, with a single helix thread defined by the aperture adapted for engaging the thread of the male fastening member. A crown projects outwardly from the dome, and includes peaked projections for engaging the depressions of the threads on the male fastening member.

An advantage of the present invention is providing a male threaded member that more positively engages the body to which it is attached.

Another advantage of the present invention is providing a threaded fastener system in which the male threaded member and the female threaded member have complementary structure for more positively engaging the male and female threads.

Still another advantage of the present invention is providing a threaded fastener system with improved back-out resistance and suitable for use on sheet metal and other thin material structures.

A further advantage of the present invention is providing an improved threaded fastener system including a female fastening member comprising a single helix thread.

A still further advantage of the present invention is providing an inexpensive, easily manufactured threaded fastening system with improved anti-rotation force between the male threaded member and the female threaded member for back-out.

Yet another advantage of the present invention is providing an easily applied modification to standard thread forms that improves the anti-back-out performance of the thread in a variety of materials.

Another advantage of the present invention is providing an improved male thread configuration, with improved anti-backout performance, that drives easily and straight.

A still further advantage of the present invention is providing a threaded fastener system that provides an indication when adequate torque is applied for optimal performance of the fastener.

Other features and advantages of the invention will become apparent to those skilled in the art upon review of the following detailed description, claims and drawings in which like numerals are used to designate like features.

Figure 1:
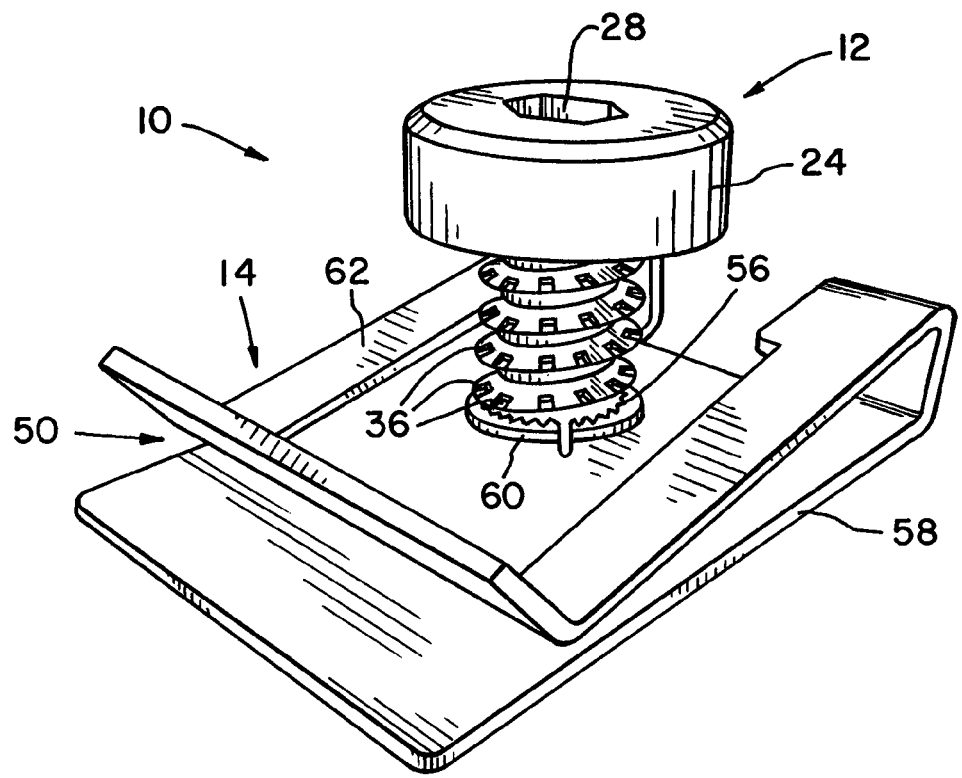
FIG. 1 is a perspective view of a threaded fastening system in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a threaded fastening system in accordance with the present invention. Threaded fastening system 10 includes a male threaded fastening member 12 and a female threaded fastening member 14 that are adapted for mutual engagement, that is male member 12 is threadedly received in female threaded member 14. Each can be provided in different lengths, different thickness, and of various materials, depending upon the intended use and application for fastening system 10. As will be described in greater detail hereinafter, the present invention contemplates use of male threaded member 12 alone, anchored in material such as plastic, without using a female threaded member 14.

Male threaded fastening member 12 includes a shank 16 having a thread 18 thereon. Shank 16 has a distal or lead end 20 that first enters and is received in female threaded fastening member 14, or material such as plastic in which male threaded member 12 is used without female member 14. Shank 16 further has a head end 22 to which a head 24 is connected. Thread 18 extends around and wraps shank 16 helically from near head 24 to lead end 20, and has a thread start 26 at lead end 20. As is readily understood, male threaded fastening member 14, in a common embodiment thereof, is provided in the suitable material, such as metal or plastic, as a monolithic structure, including shank 16, thread 18 and head 24.

In the exemplary embodiment shown, head 24 is round and includes a formed hole 28 therein having flat sides, such as for receiving a suitable wrench or other hand or power tool for a rotating male member 12 during connection of male member 12 to female member 14 or anchoring material (not shown). However, it should be understood that head 24 may be otherwise configured, such as having a slot or other shaped hole therein for receiving a screwdriver or other implement. Further, head 24 can have a hex-shaped or other flat-sided perimeter for engagement by a wrench or other tool. In some applications, it may be desirable for head 24 to have a conical shaped side so that head 24 may settle into a conical hole in a body to which fastening system 10 is connected, thereby recessing head 24 in the material, or mounting head 24 flush with the surface thereof.

As stated previously, male threaded member 12 can be provided in a variety of different thickness and lengths, depending upon its use, or the application and use of threaded fastening system 10. Thus, the helix angle of thread 18 also can vary from application to application of threaded fastening system 10.

Thread 18 defines a continuous outer edge 30 spiraling along shank 16 from head 24 toward lead end 20. In cross-section, thread 18 is generally triangular, having a drive flank 32 and a pressure flank 34. Drive flank 32 is that continuous surface of thread 18 that generally faces lead end 20. Pressure flank 34 is that surface of thread 18 that generally faces head 24. As illustrated, thread 18, including both drive flank 32 and pressure flank 34, extends from head 24 to lead end 20. However, it should be understood that in some applications and uses of the present invention, it may be advantageous that thread 18 not extend fully to head 24. An unthreaded portion of shank 16 can be provided between head 24 and thread 18. Further, it may be advantageous in some applications and uses that thread start 26 be spaced some distance from the outer edge of lead end 20. Also, lead end 20 can be tapered, as can be thread start 26, if male threaded member 12 is a thread-cutting screw or other similar construction.

Figure 2:
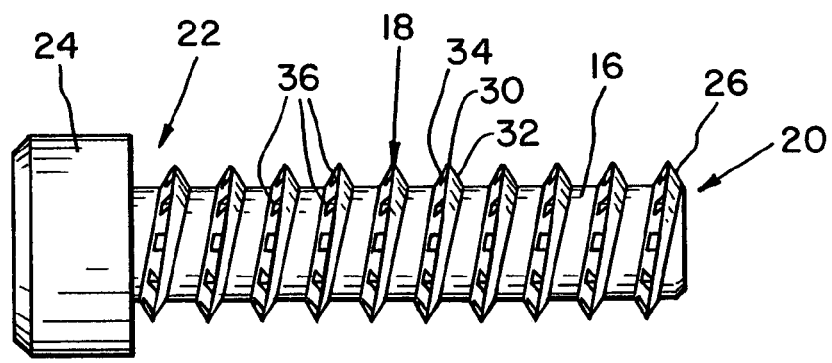
FIG. 2 is a perspective view of the male fastening member in the threaded fastening system shown in FIG. 1.
Figure 3:
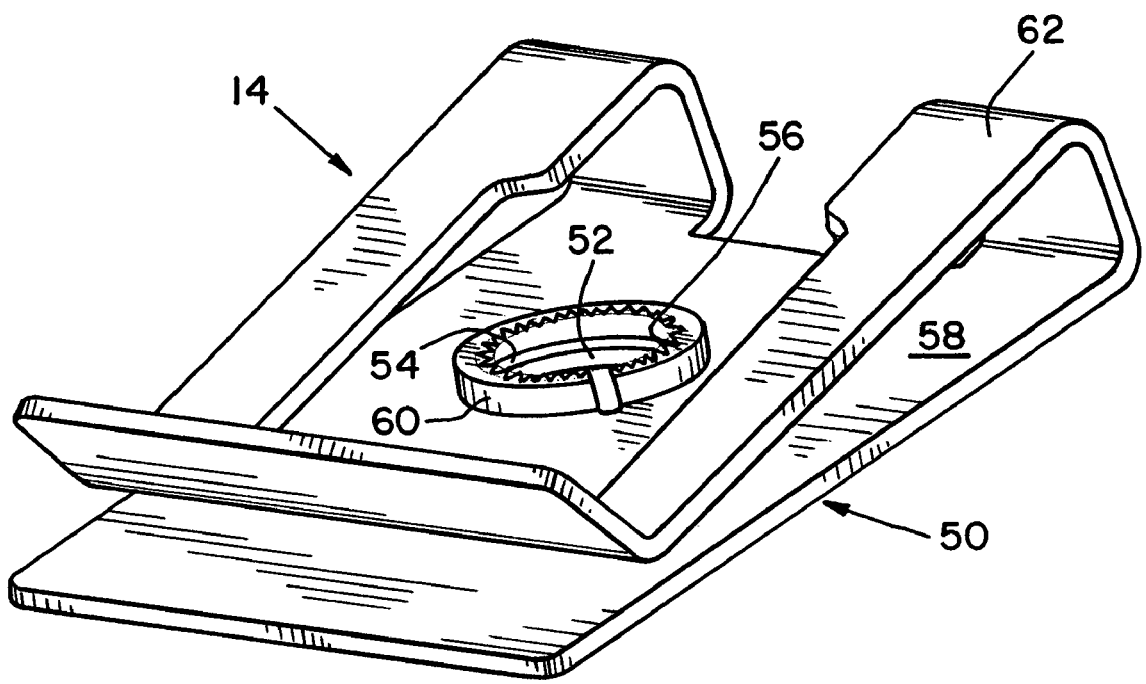
FIG. 3 is a perspective view of the female threaded component of the threaded fastening system shown in FIG. 1.
Figure 4:
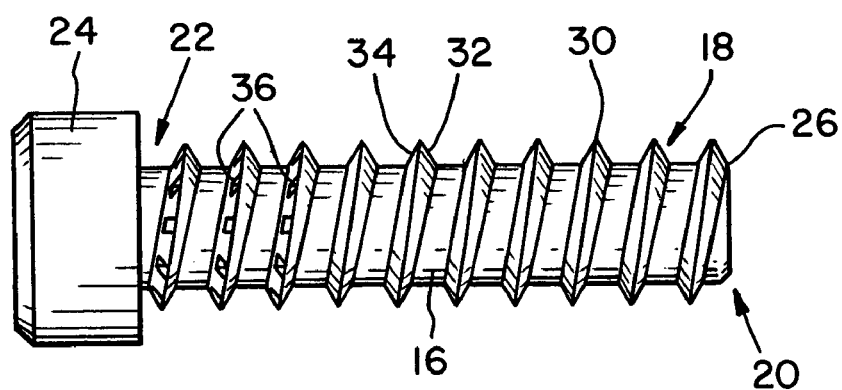
FIG. 4 is a side elevation view of a modified form of the male threaded fastening member shown in FIG. 2.

In accordance with the present invention, thread 18 is provided with a series of cavities or depressions 36 in pressure flank 34. Depressions 36 may be spaced consistently in thread 18 generally from head 24 to lead end 20 as illustrated in FIG. 2. In a modification of the present invention, as illustrated in FIG. 4, depressions 36 can be provided in only one or several helix wraps of thread 18 adjacent head 24, or in the helical wraps of thread 18 nearest head 24 if thread 18 is spaced some distance from head 24. Advantages of the present invention are achieved when depressions 36 are engaged with female threaded fastening member 14, as final torque is applied to male threaded fastening member 12 in the completed assembly. However, it should be understood that advantages of the present invention are achieved also when male threaded fastening member 12 is used alone, secured in material other than female threaded fastening member 14. For example, the present invention provides advantages when used on a thread-cutting screw type of male threaded fastening member 12 anchored in plastic or the like.

Figure 7:
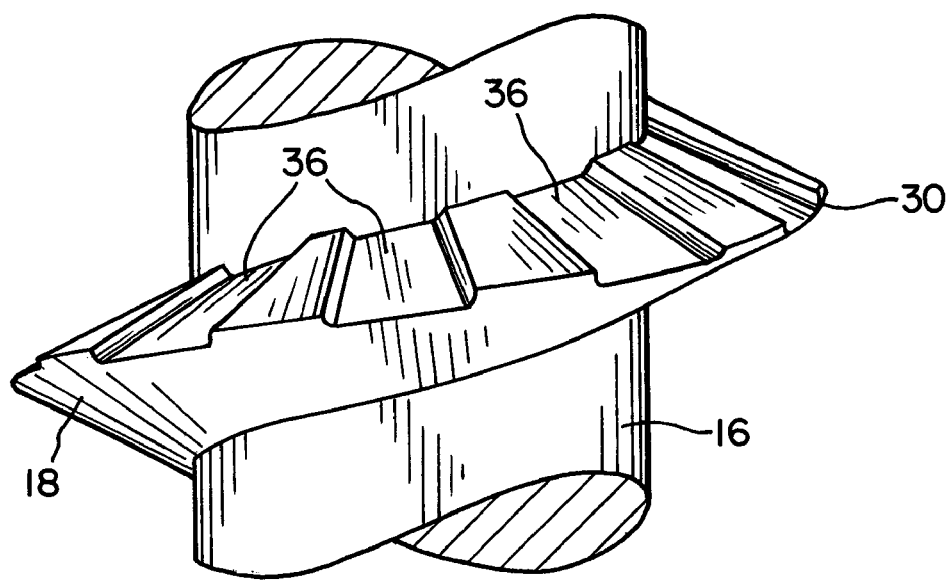
FIG. 7 is an enlarged perspective view of another embodiment of the present invention.

Depressions 36 are formed from edge 30 generally radially inwardly in thread 18, at least part of the width of thread 18 between outer edge 30 and shank 16 (FIG. 1). Alternatively, depressions 36 can extend inwardly from outer edge 30 to near shank 16, approximately the full width of thread 18 (FIG. 7). As shown in FIG. 2, and more clearly in FIG. 7, depressions 36 are formed in pressure flank 34 in such a manner as to retain a continuous outer edge 30 along thread 18 that is generally tapered to a peak, with minimal or no blunting from the formation of depressions 36. A cross-section through thread 18, at any location, generates a triangular shape, with a peak at edge 30. Depressions 36 can be of a variety of shapes, such as trapezoidal, half moon shape, asymmetrical, etc.

Figure 8:
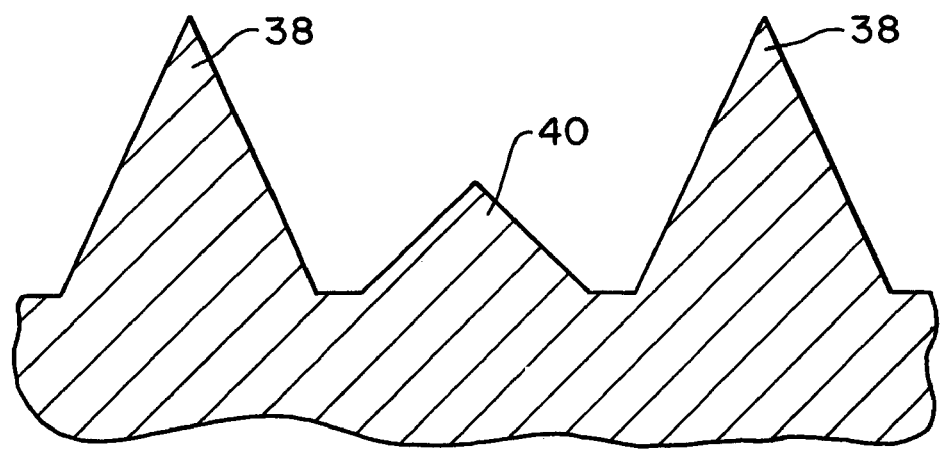
FIG. 8 is a cross-sectional view of yet another embodiment of the invention.

FIG. 8 illustrates an embodiment of the present invention of the so-called, "high-low" thread design. Alternating thread starts are provided for a high thread 38 and a low thread 40, so that alternating high and low threads are provided along the axial length of male threaded member 12. Low thread 40 has a diameter approximately equal to the diameter of the hole in which male threaded member 12 is fastened. Low thread 40 helps gather material to push against pressure flank 34. Moving material against pressure flank 34, and depressions 36, further improves the resistance to pull-out. Alternatively, a "high-double low" thread design can be used. Moreover, the threads may be asymmetrical in shape and design.

Figure 5:
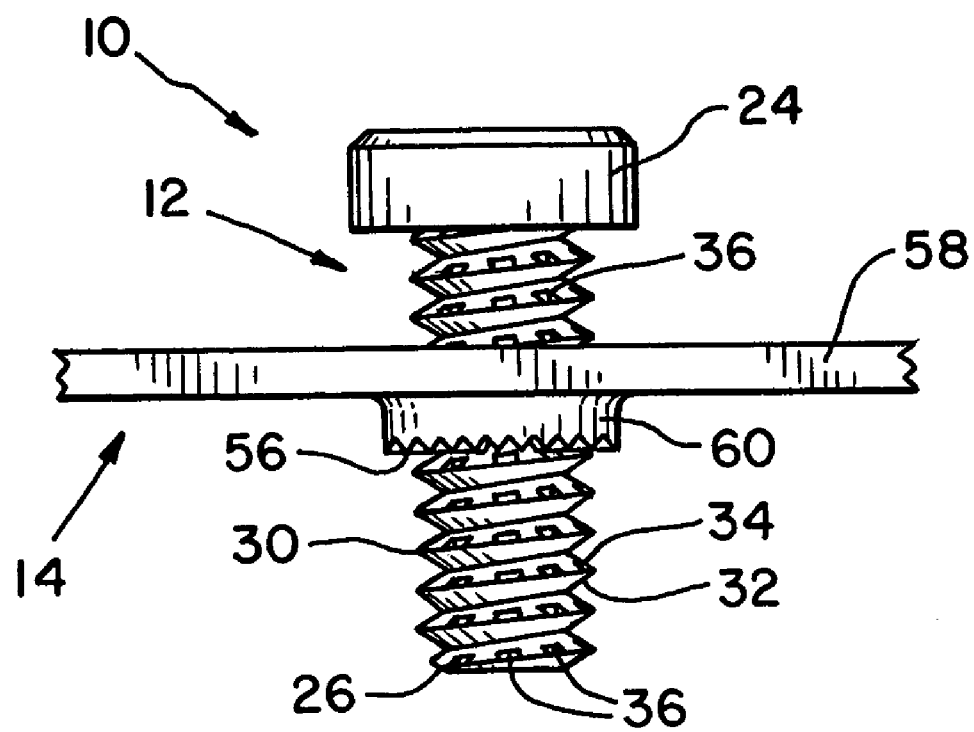
FIG. 5 is a elevation view of a modified form of the threaded fastening system shown in FIG. 1.

Female threaded fastening member 14 provides additional advantages in fastening system 10, and includes a body 50 defining an aperture 52 therein for receiving male threaded fastening member 12. Aperture 52 defines a thread 54, preferably a single helix thread, configured for engaging thread 18 of male threaded fastening member 12. Body 50 defines a plurality of projections 56 adapted for engaging depressions 36 in pressure flank 34. As illustrated in FIG. 1, projections 56 can be provided in body 50 at a peripheral edge of aperture 52 facing head 24. Alternatively, as illustrated in FIG. 5, projections 56 are provided in body 50 at a peripheral edge of aperture 52 facing toward lead end 20 of male threaded fastening member 12 received in female threaded fastening member 14.

Body 50 can be a conventional nut, or, as illustrated in FIG. 1, body 50 can include a relatively thin plate member 58 having an enlargement 60 in which aperture 52 is defined. Enlargement 60 can include one or several helix wraps of thread 54. A spring arm 62 or other structure can be provided on body 50 for attaching female threaded member 14 to an edge of a sheet or plate-like body to which fastener 10 is to be applied. Advantageously, with spring arm 62 or other such structure, female threaded member 14 can be pre-assembled to the article on which threaded fastener system 10 is used. The final connection of another article or thing thereto via male threaded member 12 can be made by simply driving male threaded fastening member 12 into female threaded fastening member 14, without having to grasp or hold female threaded fastening member 14. Alternatively, female threaded fastening member 14 can be provided as a simple nut or other common structure.

Figure 6:
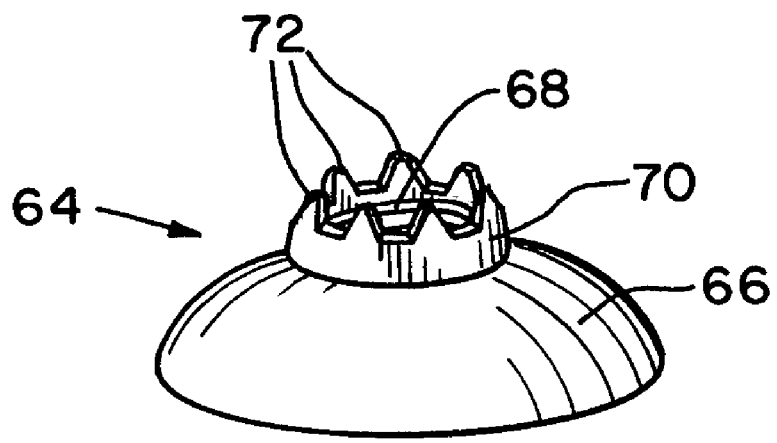
FIG. 6 is a perspective view of a single helix female threaded component for a threaded fastening system in accordance with the present feature.

The present invention provides particular advantages when used with a stamped, single helix female threaded fastening member 64, as illustrated in FIG. 6. Female threaded fastening member 64 includes a dome shaped body 66 having a single helix thread 68 therein, and is formed by stamping. In accordance with the present invention, a crown 70 is provided and forms a plurality of peaked projections 72 extending outwardly from dome-shaped body 66, for engaging depressions 36 in pressure flank 34.

In the use of threaded fastening system 10 in accordance with the present invention, as male threaded fastening member 12 is engaged in female threaded fastening member 14, and tightened therein, projections 56 or 72 engage depressions 36 in thread 18. When fully tightened projections 56, 72 are seated in depressions 36 with sufficient force that the projections will not readily slide out of depression 36 from vibrations and other external forces. Back-out torque requirements are increased. Thus, increased retention force is provided as compared with conventional threaded fasteners in which simple sliding friction determines the retention force. In accordance with the present invention, a mechanical lock is provided between projections 56, 72 and depressions 36. As final tightening torque is applied to male threaded fastening member 12, and fastening system 10 begins experiencing outwardly directed load forces against head 24 and female threaded fastening member 14, projections 56, 72 begin engaging depressions 36, creating a ratcheting sensation, by feel and/or sound, indicating that the components are tightened sufficiently In the use of male threaded fastening member 12 without female threaded fastening member 14, depressions 36 allow material embedding, for locking male threaded fastening member 12 in position. Whether used with or without female threaded fastening member 14, depressions 36 are, in essence, ineffective during initial driving functions, as pressure flank 34 has only minimal contact with the material to which thread 18 is engaged. Only as final tightening occurs does pressure flank 34, and thus depressions 36, significantly influence the assembled joint. Thus, the effect of depressions 36 in pressure flank 34 is first experienced only as fastening member 12 is tightened. Drive flank 32 is smooth so that fastening member 12 is easy to drive and drives straight when cutting threads in anchoring material. Since depressions 36 are configured to maintain the point on crest 30, minimal material is removed and adequate material remains for a strong assembled joint.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A threaded fastener, comprising:
a shank having a head end and a lead end;
a head at said head end;
a thread disposed about said shank, said thread having a drive flank facing said lead end and a pressure flank facing said head end, said drive flank and said pressure flank extending from said shank to meet and form a continuous, uninterrupted, helical outer edge crest such that said continuous outer edge crest is configured to include a substantially formed peak at each point along its length, said drive flank having a generally flat surface extending from said shank to said outer edge crest of said thread along substantially a length of said thread from said lead end to said head end; and
a series of spaced apart depressions in said pressure flank along at least a portion of the length of said thread, wherein said depressions are formed from said outer edge crest of said thread generally radially inwardly towards said shank in such a manner so as to retain said continuous outer edge of said thread, said depressions being further formed so as to extend inwardly along said pressure flank from said outer edge of said thread at least part of a width of said pressure flank between said shank and said outer edge of said thread, said depressions located entirely below the plane of the pressure face, in the direction of said lead end and having no projections extending above the plane of the pressure face in the direction of the head end.

2. The threaded fastener of claim 1, said depressions formed in said pressure flank along substantially the length of said thread from said lead end to said head.

3. The threaded fastener of claim 2, said depressions extending front said shank to said outer edge of said thread.

4. The threaded fastener of claim 1, said portion of said length of said thread disposed adjacent said bead, and a further portion of said thread adjacent said lead end having no depressions therein.

5. The threaded fastener of claim 4, said depressions extending from said shank to said outer edge of said thread.

6. The threaded fastener of claim 1, said depressions extending from said shank to said outer edge of said thread.

7. The threaded fastener of claim 1, wherein said threaded fastener is a male fastening member and said male fastening member is one component of a threaded fastening system that further includes a female fastening member adapted for threaded engagement with said male fastening member, said female fastening member including a body defining an aperture therethrough with at least one helical thread defined by said aperture adapted for engaging said thread of said male fastening member, and said body having irregularities forming projections for engaging said depressions of said threads on said male fastening member.

8. The threaded fastener of claim 7, said surface irregularities comprising a series of adjacent peaked projections projecting toward said lead end of said male threaded member positioned therein.

9. The threaded fastener of claim 7, said depressions formed in said pressure flank along substantially the length of said thread from said lead end to said head.

10. The threaded fastener of claim 7, said depressions extending from said shank to said outer edge of said thread.

11. The threaded fastener of claim 7, said portion of said length of said thread disposed adjacent said head, and a further portion of said thread adjacent said lead end having no depressions therein.

12. The threaded fastener of claim 7, said irregularities comprising projections around a peripheral edge of said aperture.

13. The threaded fastener of claim 12, said peripheral edge facing said head of said male threaded member positioned therein.

14. The threaded fastener of claim 12, said peripheral edge facing said lead end of said male threaded member positioned therein.

15. The threaded fastener of claim 7, said female fastening member comprising a sheet metal nut having a body forming a dome, and said projections comprising a crown projecting outwardly from said dome.

16. The threaded fastener of claim 1, wherein said threaded fastener is a male fastening member and said male fastening member is one component of a threaded fastening system that further includes a female fastening member adapted for threaded engagement with said male fastening member, said female fastening member being a sheet metal single helix nut adapted for receiving said male fastening member therein, said female fastening member including a body shaped as a dome defining an aperture therethrough, with a single helix thread defined by said aperture adapted for engaging said thread of said male fastening member, and a crown projecting outwardly from said dome, said crown including peaked projections for engaging said depressions of said threads on said male fastening member.

17. The threaded fastener of claim 16, said depressions extending from said shank to said outer edge of said thread.

18. The threaded fastener of claim 1, wherein said threaded fastener is a male fastening member and said male fastening member is one component of a threaded fastening system that further includes a female fastening member adapted for threaded engagement with said male fastening member, said female fastening member including a body defining an aperture therethrough with at least one helical thread defined by said aperture adapted for engaging said fined of said male fastening member, said at least one helical thread of said female fastening member being formed of plastic.

* * * * *